E. WOLD.
HATCHWAY.
APPLICATION FILED APR. 21, 1908.

905,041.

Patented Nov. 24, 1908.

2 SHEETS—SHEET 1.

Witnesses
Phil E. Barnes
C. Bradway

Inventor
Ernest Wold.
By Victor J. Evans
Attorney

E. WOLD.
HATCHWAY.
APPLICATION FILED APR. 21, 1908.
905,041.
Patented Nov. 24, 1908.
2 SHEETS—SHEET 2.
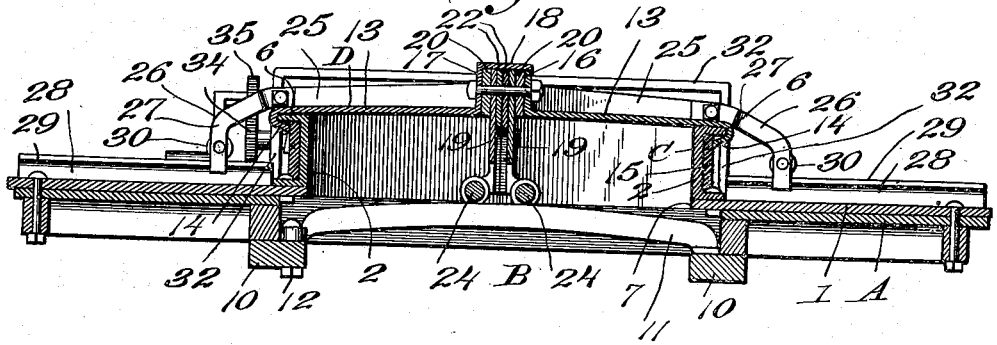
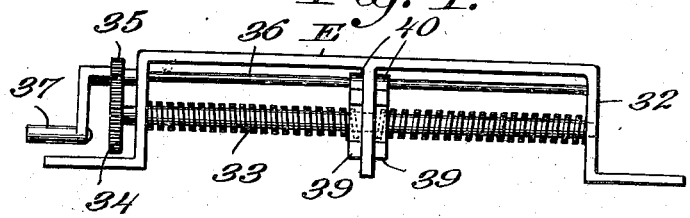
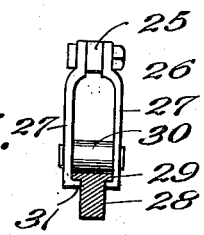
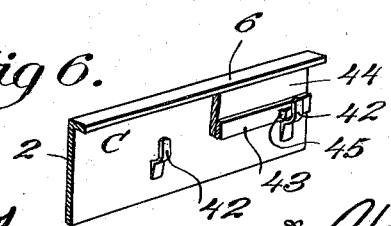
Witnesses
Phil E. Barnes
C Bradway
Inventor
Ernest Wold
By Victor J. Evans
Attorney

UNITED STATES PATENT OFFICE.

ERNEST WOLD, OF SUPERIOR, WISCONSIN.

HATCHWAY.

No. 905,041.   Specification of Letters Patent.   Patented Nov. 24, 1908.

Application filed April 21, 1908. Serial No. 428,310.

*To all whom it may concern:*

Be it known that I, ERNEST WOLD, a citizen of the United States, residing at Superior, in the county of Douglas and State of Wisconsin, have invented new and useful Improvements in Hatchways, of which the following is a specification.

This invention relates to hatchways for vessels, and has for one of its objects to provide a hatchway and hatch which is of substantial and durable construction, comparatively easy and inexpensive to manufacture, and perfectly weather-tight.

Another object of the invention is the provision of a hatchway in which the hatch is made of two sections which open outwardly in opposite directions by means of a novel mechanism.

A further object of the invention is the employment of tracks extending from opposite sides of the hatchway, on which the hatch sections slide during the opening and closing movements, the hatch sections being supported at their inner portions by a bar extending across the hatchway and on which rollers carried by the hatch sections move.

An additional object is to provide a hatchway having a coaming provided with an outwardly-extending peripheral flange under which engages inwardly-extending flanges on the hatch sections, the last-mentioned flanges being adapted to impinge on a rubber or other packing extending entirely around the coaming, whereby a weather-tight joint is provided.

With these objects in view and others, as will appear as the description proceeds, the invention comprises the various novel features of construction and arrangement of parts which will be more fully described hereinafter and set forth with particularity in the claims appended hereto.

Figure 1:
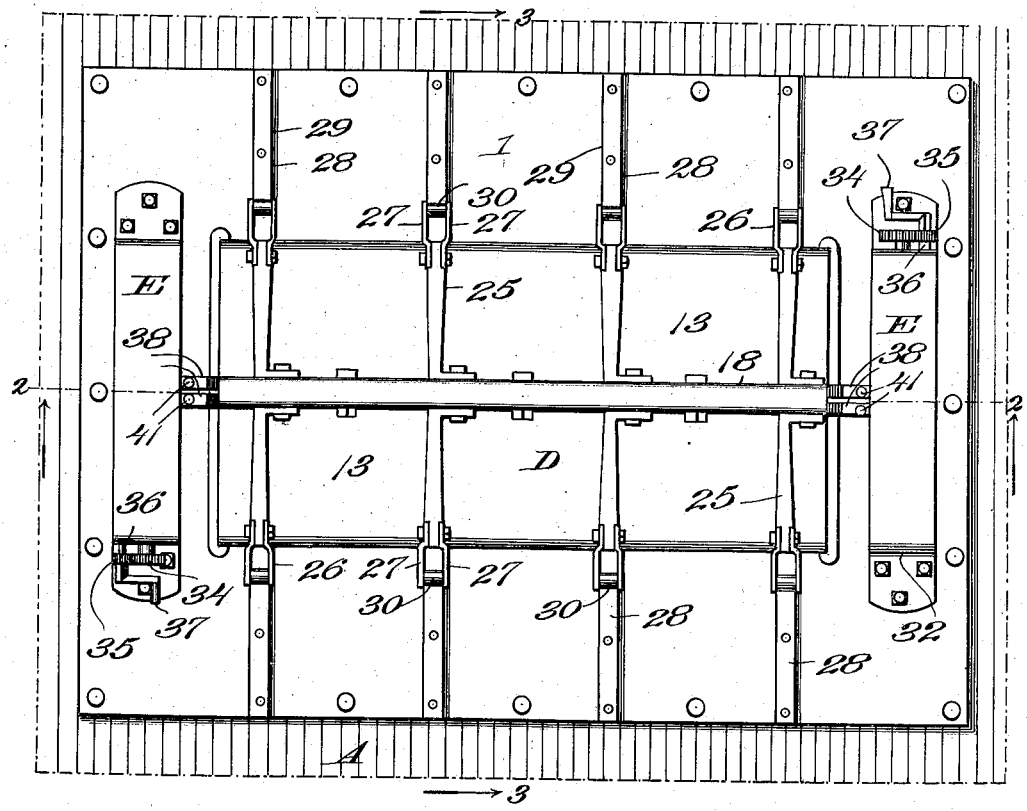
Figure 2:
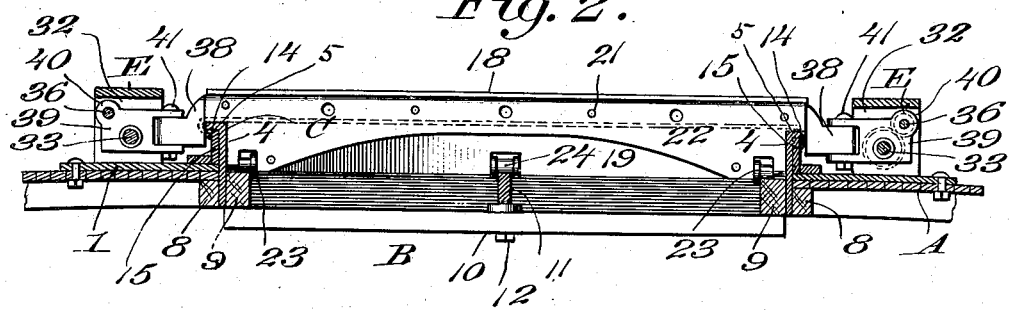

In the accompanying drawings, which illustrate one of the embodiments of the invention, Figure 1 is a plan view of the improved hatchway with the hatch sections in closed position. Fig. 2 is a longitudinal section thereof on line 2—2, Fig. 1. Fig. 3 is a transverse section on line 3—3, Fig. 1. Fig. 4 is an elevation of the hatch opening mechanism. Fig. 5 is a detail sectional view showing one of the runners of a hatch section and the rail therefor. Fig. 6 is a detail sectional view of a portion of a hatchway coaming showing one method of securing a packing to the coaming.

Similar reference characters are employed to designate corresponding parts throughout the several views.

Referring to the drawing, A designates the deck of the vessel on which is laid and secured the base-plate 1 of sheet metal of suitable gage and extending entirely around the hatchway. The hatchway B is provided with a coaming C composed of side members 2 of channel iron, as shown in Fig. 3, and end members 4 having outwardly extending flanges 5 disposed flush with the laterally-extending flanges or webs 6 of the channel irons 2. The channel irons 2 are bolted or otherwise suitably secured to the plate 1 and are arranged along the side edges of the opening 7 of the said plate, while the end members 4 of the coaming extend into the hatchway and bear against the beams 8 of the deck, Fig. 2.

Arranged inside the hatchway and disposed along the end members 4 of the coaming are cross-pieces or beams 9, and extending longitudinally of the hatchway and secured to the deck are beams 10. Riveted to the center of one of the beams 10 is a swinging bar 11 fulcrumed at 12 and adapted to bear at its free end on the opposite beam 10 to support the hatch sections when the hatchway is closed, the said bar being adapted to swing to one side and rest on the beam to which it is pivoted when it is desired to lower or raise objects into and from the hold of the vessel.

The hatch D is composed of two sections 13 which meet at their inner edges and are adapted to slide laterally to opposite sides of the hatchway when it is desired to open the latter. Each section is made of sheet metal of suitable gage and has its outer longitudinal and end edges bent downwardly and inwardly to form flanges 14 to embrace the flanges 5 and 6 of the hatchway coaming C, and around the coaming extends a packing strip 15 of rubber or other suitable material against which the flanges 14 of the hatch sections bear so as to form a weather-tight joint, the packing strip being disposed under the flanges 5 and 6 of the coaming so as to be held in place thereby.

As shown in Fig. 3, the inner edge of one section is bent into an upwardly-extending flange 16, while the other section is bent into a flange 17 parallel with the other and provided with a horizontal flange or cap strip 18 that extends over the flange 16 so as to constitute a water-tight joint. The hatch sections are each provided with a longitudinally-extending plate 19 disposed inwardly from the upwardly-extending flange and spaced from the latter by a filling strip 20, the latter and plate being secured to the flange by rivets 21, Fig. 2. The inner opposed faces of the plates are provided with rubber or other facing strips 22 which, when the hatch sections are bolted together, effectively seal the joints between the sections so that water cannot enter the hatchway. The vertical plates 19 extend below the hatch sections and are each provided with rollers 23 that ride on the end cross pieces or beams 9 and with a central roller 24 that rides on the pivoted cross bar 11 which is slightly arched to draw the flanges 14 upwardly against the flanges 5 and 6 of the coaming.

The hatch sections are stiffened by means of rib pieces 25 arranged transversely thereto and riveted or otherwise fastened. Secured to the outer ends of the rib pieces are runners 26 that extend outwardly and downwardly and are composed of members 27 that span tracks 28 secured to the plate 1 at opposite sides of the hatchway. Each track is of T-shaped cross section as shown in Fig. 5, and the lower ends of the members 27 are bent inwardly toward each other to engage under the oppositely-extending webs 29 of the rail and secured to the runner 26 is a roller 30 disposed between the members 27 and arranged to ride over the top surface of the rail and to coöperate with the inturned extremities 31 of the members 27 to connect the levers with the rails.

As the hatch sections move open and closed, they are supported on the tracks 28 by means of the runners 27 and on the ledges 9 and cross bar 11 by the rollers 23 and 24, the rollers permitting the hatch to be opened and closed freely.

In the present instance, separate mechanisms E are employed at opposite ends of the hatchway for manually opening the hatch. Each mechanism comprises a frame 32 bolted or otherwise secured to the supporting plate 1 and mounted in the frame is a horizontal operating screw 33 provided with right and left threads whereby the rotation of the screw will move the hatch sections inwardly or outwardly simultaneously. On one end of the screw is a gear wheel 34 that meshes with a pinion 35 on a shaft 36 mounted in the frame 32 and disposed parallel with the screw.

The shaft 36 is equipped with an operating crank 37, whereby the screw is turned. On the ends of each hatch section are lugs 38, as shown in Fig. 2, to which are hingedly connected members 39 that are threaded to receive the operating screws 33. These members 39 are provided with openings 40 for receiving the shafts 36 whereby the latter serve as guides for the members so that they will not bind on the screws, and the hinge joint 41 between the lugs 38 and members 39 provide freedom of movement between the hatch sections and the opening and closing mechanisms so that the parts will not bind. In opening or closing the hatch, it requires the service of two men to operate both mechanisms E at the same time.

In Fig. 6, a modification is shown wherein the coaming C is provided with lugs 42 for receiving strips of wood 43 for holding packing strips 44 against the coaming, the strips 43 being secured in place by wedges 45.

From the foregoing description, taken in connection with the accompanying drawings, the advantages of the construction and of the method of operation will be readily apparent to those skilled in the art to which the invention appertains, and while I have described the principle of operation of the invention, together with the apparatus which I now consider to be the best embodiment thereof, I desire to have it understood that the apparatus shown is merely illustrative, and that such changes may be made when desired, as are within the scope of the claims appended hereto.

Having thus described the invention, what I claim is:—

1. The combination of a hatchway, with a hatch composed of sections, spaced ribs on the top of each section and extending from the outer to the inner edge thereof, tracks at opposite sides of the hatchway, and devices secured to the ribs and engaging the tracks for guiding the movement of the sections.

2. The combination of a hatchway, with a hatch composed of slidably mounted sections, right and left hand screws at the end of the hatchway, members engaging the screws, a hinge joint between each member and the end of the adjacent hatch section, and means for turning the screws.

3. The combination of a hatchway, with a hatch composed of slidably mounted sections, spaced runners on the sections projecting from the outer side thereof, spaced parallel, laterally-extending tracks at opposite sides of the hatchway and to which the runners are slidably connected, and means for operating the hatch sections.

4. The combination of a hatchway, with a hatch composed of slidably mounted sections, runners secured to the sections and extending outwardly therefrom and each composed of spaced members, tracks arranged at opposite sides of the hatchway and each embraced by the members of a runner, and means for slidably connecting the runners with the tracks.

5. The combination of a hatchway, with a hatch composed of slidable sections, T-shaped tracks arranged at opposite sides of the hatchway, runners on the said sections and each composed of members embracing one of the tracks, and an anti-friction device on each runner to ride on the track embraced by such runner.

6. The combination of a hatchway, with a hatch composed of slidable sections, means within the hatchway for slidably supporting the inner portions of the sections, and means exterior to the hatchway for slidably supporting the outer portions of the sections.

7. The combination of a hatchway, and a track bar extending across the hatchway and adjustably mounted, with slidably mounted hatch sections, members carried by the sections and bearing on the said bar, and means for actuating the hatch sections.

8. The combination of a hatchway, hatch sections having flanges at their meeting edges, vertical plates secured to the flanges and extending into the hatchway and serving to limit the outward movement of the sections, packing strips secured to the said plates, and fastenings passing through the flanges and plates for securing the sections together.

9. The combination of a hatchway, hatch sections, plates secured to the meeting edges of the sections and depending therefrom, packing strips disposed between the plates, means for fastening the sections together, supporting members on which the said sections are slidably mounted, and anti-friction devices mounted on the plates and arranged to ride on the said supporting members.

In testimony whereof I affix my signature in presence of two witnesses.

ERNEST WOLD. [L. S.]

Witnesses:
    CHARLEY REED,
    GUST JOHNSON.